Dec. 5, 1933.     H. M. MEYER ET AL     1,938,192
CROSSING GATE OPERATING MEANS
Original Filed April 29, 1929    2 Sheets-Sheet 1
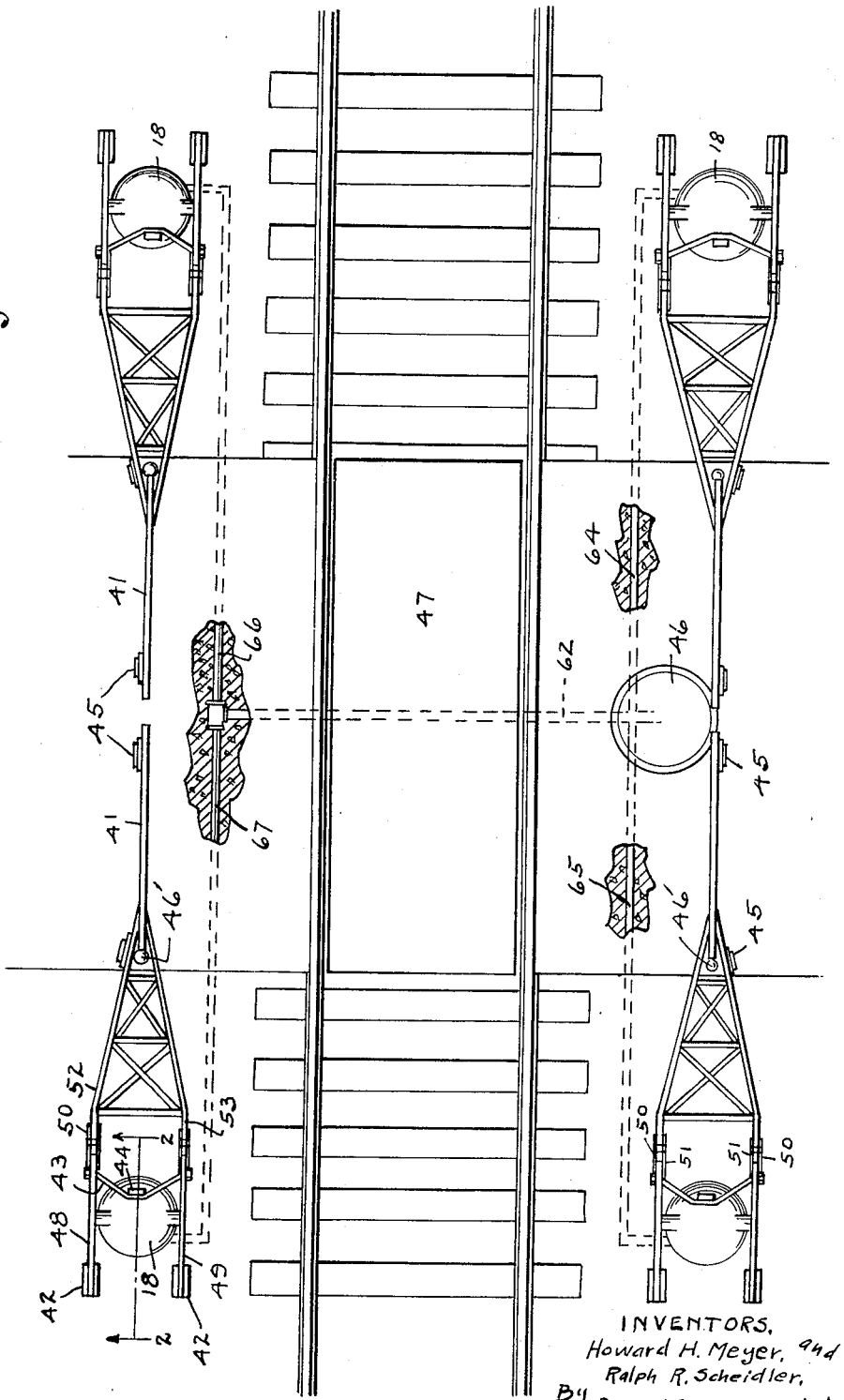
INVENTORS.
Howard H. Meyer, and
Ralph R. Scheidler,
By Minturn & Minturn,
Attorneys.

Dec. 5, 1933.     H. M. MEYER ET AL     1,938,192
CROSSING GATE OPERATING MEANS
Original Filed April 29, 1929     2 Sheets-Sheet 2

INVENTORS,
Howard H. Meyer and
Ralph R. Scheidler,
By Minturn & Minturn,
Attorneys.

Patented Dec. 5, 1933

1,938,192

UNITED STATES PATENT OFFICE 1,938,192

CROSSING GATE OPERATING MEANS

Howard M. Meyer and Ralph R. Scheidler, Indianapolis, Ind., assignors to Automatic Safety Signal Gate Company, Columbus, Ind., a corporation of Nevada Original application April 29, 1929, Serial No. 358,859. Divided and this application November 14, 1931. Serial No. 574,978

4 Claims. (Cl. 246—128)

Reference is made to our copending application for U. S. Letters Patent filed April 29, 1929, Serial No. 358,859, of which this application is a division.

This invention relates to gates employed as barriers at railway crossings of highways and the like, and has for its primary objects the provision of a gate lowering and raising mechanism automatically operated upon a predetermined travel of a train or car along the railway in reference to the highway crossing; the provision of a gate yielding in its vertical plane of travel for prevention of damage should the gate be lowered onto a passing vehicle; and the provision of means forcing the gate to a lowered position and permitting the gate to return to a raised position by action of gravity whereby no electrical energy will be exerted in relation to the gate operating mechanism at any time during the stationary raised position of the gate.

Other important objects reside in the provision of a simple gate operating mechanism that will be extremely durable throughout long periods of usage and under varying weather conditions; and the provision of a structure that has few moving parts and that are readily accessible for inspection, adjustment and replacement when necessary.

These and other objects will become apparent in the following description of one form of the invention as shown by the accompanying drawings, in which—

Figure 3:
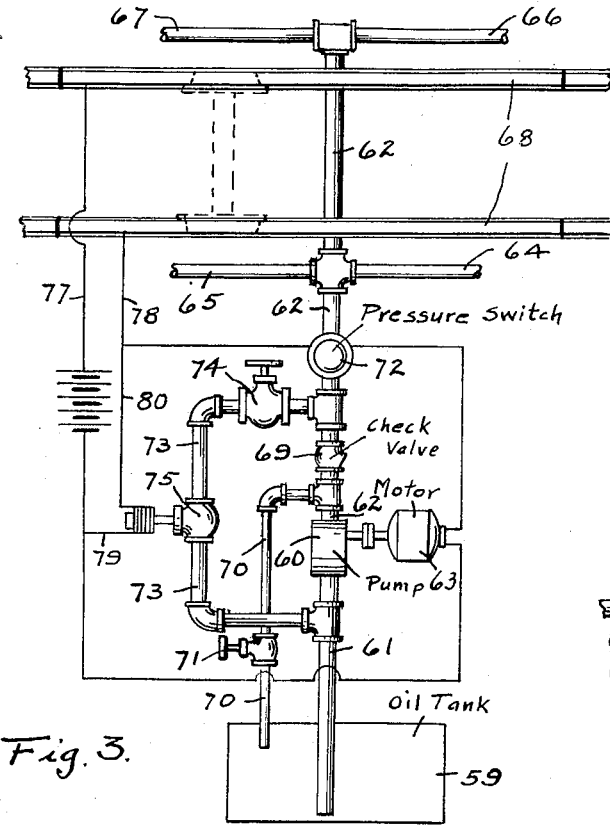
Figure 2:
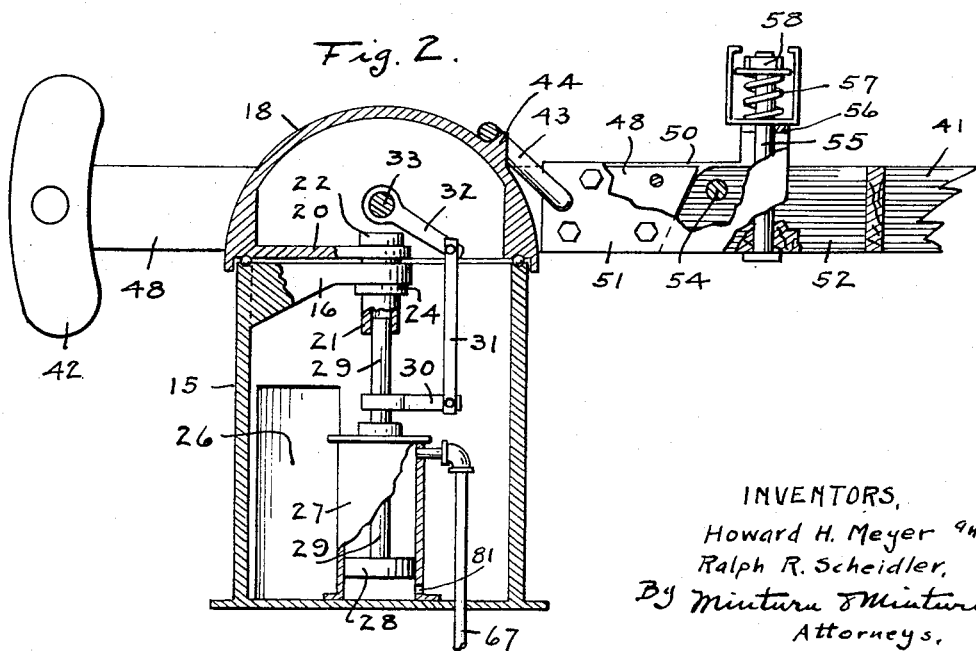

Fig. 1 is a top plan view of a highway and railway crossing with our invention applied thereto;

Fig. 2, a fragmentary vertical section on the line 2—2 in Fig. 1, on an enlarged scale;

Fig. 3, a combined wiring and piping diagram; and

Figure 4:
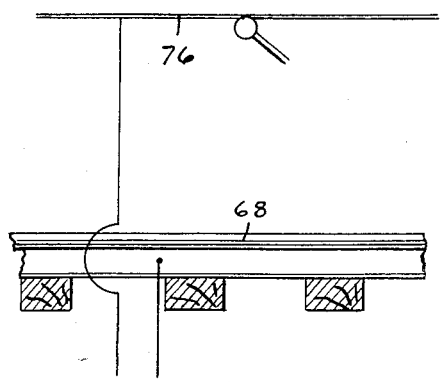

Fig. 4, a detail in diagrammatic form of a modified source of power.

Like characters of reference indicate like parts throughout the several views in the drawings.

We form a hollow cylindrical standard 15 having an arm 16 projecting horizontally from its top edge toward the center of the standard to have a hole bored vertically therethrough axially of the standard. A hemi-spherical dome 18 is positioned over the standard 15 and an arm 20 projects horizontally from the lower edge of the dome 18 toward the center thereof and has a hole bored vertically therethrough axially of the standard 15. A sleeve 21 having a collar 22 on its upper end is passed through the hole in the arm 20 and down through the hole in the arm 16 to have the collar 22 rest on the top arm 20.

The sleeve 21 is fixed to the arm 20 but rotatively passes through the arm 16 to have a collar 24 carried on the sleeve 21 pressed up against the under side of the lower arm 16 and there secured as a means of preventing the lifting of the dome 18 from off the standard 15. A door 26 is provided in the side of the standard 15 to permit access to within.

On the floor of the standard 15, we secure a cylinder 27 in a vertical position axially of the standard 15. A piston 28 is carried within the cylinder and has a piston rod 29 affixed thereto and extended to without the cylinder to slidably enter and be guided within the sleeve 21 thereabove. An arm 30 is fixed to the rod 29 to project horizontally therefrom, and to its outer end is pivotally connected therewith, a link 31 which extends upwardly therefrom to have its upper end pivotally secured to the outer end of the lever 32.

The lever 32 is fixed on the transverse shaft 33 which is rotatably carried in bearings on opposite sides of the dome 18.

The shaft 33 projects by each end from the dome 18 to carry thereon in a fixed position the gate 41 by the parallel arms 48 and 49 which carry the counterweights 42 beyond the shaft. The counterweights are of sufficient weight to overcome the weight of the gate and normally rock it to an upper open position.

A yoke 43 joins the two sides of the gate and is formed to contact with and bear against the lug 44 on the dome to limit the downward swing of the gate to a horizontal position. Reflecting glasses 45 are provided along the gate and a light 46' is mounted thereon in a protected position as warning signals. The arms 48 and 49 have their forward ends cut off diagonally downward and backward toward the standard 15, and have the side plates 50 and 51 fixed to and extending along from the sides of the arms 48 and 49 to receive therebetween the rear ends of the gate arms 52 and 53 on the pivot pin 54, the ends of the gate arms 52 and 53 being cut diagonally to abut against the ends of the arms 48 and 49 so that the gate 41 may be swung upwardly about the pin 54, but may not drop below a straight line position of the gate 41 and the arms 48 and 49.

A bolt 55 extends from the top side of the gate arms 52 and 53 and passes up through a yoke 56 carried on the arms 48 and 49 and compressively holds a spring 57 against the top side of the yoke 56 by the nut 58, the spring 57 serving as a cushion in retarding the sudden stopping of the gate 41 when coming to a straight line position with the arms 48 and 49.

At some convenient place, here shown in Fig. 1 as in a well 46 in the highway 47, an oil supply tank 59 is located, and a pump 60 is mounted in close proximity thereto to have an intake line 61 and a discharge line 62. The pump is driven by the electric motor 63. The line 62, by suitable branches 64, 65, 66 and 67 leads to each of the standards 15 carrying the gates 41, here shown in Fig. 1, as four in number, two on each side of the railway track 68, and discharges thereby into the top ends of the cylinders 27.

In the discharge line 62 is a check valve 69, and from between the check valve 69 and the pump 60 leads a by-pass line 70 back to the tank 59 with a regulating valve 71 therein. Beyond the check valve 69, a pressure controlled electric switch 72 is interconnected with the line 62 to communicate line pressures thereto. Between the switch 72 and the check valve 69, a pump by-pass line 73 is connected into the line 62 to lead around the pump 60 and back into the intake line 61. In the by-pass line 73 is a manually operated shut-off valve 74 and an electrically operated shut-off valve 75 of the electro-magnetic type.

The track 68 is suitably divided into blocks in the usual manner so that a car or train approaching the highway 47 may operate an electric circuit to cut in a supply of electricity to operate the motor 63. It is to be remembered that the gates normally remain open or in an upright position leaning toward the highway slightly from a vertical position. In that position, the shaft 33 is rocked to cause the lever 32 by the link 31 to pull the piston 28 to the upper end of the cylinder 28.

Now when the train enters the block on the track 68 to close a circuit, here shown as through a battery in Fig. 3, and from the trolley wire 76 and track 68 of an electric line, Fig. 4, current will flow through the wires 77 and 78 Fig. 3, to set the motor 63 in operation. At the same time, current will flow through the wires 79 and 80 to operate the valve 75 so as to close the by-pass line 73. The pressure switch 72 is closed when the gate is up. The motor drives the pump 60 to withdraw oil from the tank 59 up through the intake pipe 61 and discharge oil into the line 62 through the check valve 69 and past the pressure switch 72 on into the cylinders 27 to drive the pistons 28 therein downwardly and hence pull the gates 41 down to overcome the counterweights. An air vent 81 is provided at the lower end of each cylinder 27.

When the gates 41 reach the horizontal positions as determined by the yokes 43, further movement of the pistons 28 is prevented with the result that the pump 60, still delivering oil, will cause a pressure to be built up in the cylinders 27 and line 62 above that normally required to lower the gates, and at a predetermined increase in pressure in the line 62 above the normal operating pressure, the switch 72 will be opened by reason of that pressure increase so that the motor 63 will be stopped. However, as long as the train is within the block, current is still being supplied to the magnet of the valve 75 to hold the valve closed. Therefore, by reason of the closed valve 75 and the check valve 69, no oil can flow back from the line 62 and the pressure is maintained therein. Should the pressure drop due to leaks, the switch 72 would automatically be closed and the motor set in operation to restore the pressure and then again be opened to stop the motor.

The by-pass line 70 is provided as a means for bleeding back part of the oil from the line 62 where the motor may turn so rapidly as to shoot the oil through the line 62 to cause too rapid a descent of the gates 41. The valve 71 is accordingly manipulated to secure the desired speed of lowering the gates. Now as soon as the block is clear, and no current is supplied the wires 77 and 78, the valve 75 is released from the magnetic pull and returns to an open position so that oil may then drain back from the line 62 into the tank 59 reducing the pressure to permit the switch 72 to close and be ready for the next operation and to permit the counterweights 42 to pull the gates 41 back to the open positions.

While it is customary to employ some audible warning signal in conjunction with the operation of the gates 41, it may happen that the gates 41 start to lower as a vehicle approaches the crossing on the highway and that the vehicle continues on over the crossing. If a gate strikes the vehicle while being lowered, its hinged construction permits the mechanism within the standard 15 to continue functioning without damage and as soon as the vehicle moves on out from under, the gate proper may drop on down to the horizontal position.

While we have here described and shown our invention in the best form now known to us, it is obvious that structural changes may be made from that form without departing from the spirit of the invention, and we, therefore, do not desire to be limited to that form, nor any more than may be required by the following claims.

We claim:

1. In a crossing gate, a standard, a cylinder, a piston in the cylinder, a gate rockably carried by the standard, connections between the piston and the gate formed to rock upon the travel of the piston, a tank adapted to hold a supply of oil, a pump having an intake line from the tank, a motor for driving the pump, a discharge line from the pump to said cylinder, check means in the discharge line between said pump and said cylinder, a source of current, an electric circuit including said source of current and said motor therein, a pressure operated switch subjected to pressures exerted in said cylinder from said discharge line, said switch being in said circuit and adapted to close and open the circuit within a predetermined range of said pressures, a pump and check means by-pass line returning back to said tank from said cylinder, an electro-magnetically operated valve in said by-pass line normally open, an electrical circuit including said source of current and the electro-magnet means of said valve, and means for closing and opening both of said circuits simultaneously, said discharge line entering said cylinder on that side of said piston, means by the movement of which from said point of entrance will rock and swing said gate downwardly from its normally upright position, and stop means associated with said gate for stopping the downward travel of said piston and causing a pressure to be built up in said discharge line over and above that normally required for moving said piston.

2. In a crossing gate rockably carried by a standard, a cylinder, a piston in the cylinder, connections between the piston and the gate formed to rock the gate upon travel of the piston, an oil supply tank, a pump having an intake line from said tank and a discharge line to said cylinder, a pressure operated electric switch subjected to the pressure in said discharge line, a motor adapted to operate said pump and controlled by said switch, a by-pass line about said pump between said discharge and intake lines, and an electrically operated valve in said by-pass line, said valve being normally open.

3. For a railroad crossing having a source of current made available upon the approach of a vehicle on the railroad, the combination of a standard, a gate rockably carried by the standard, a cylinder, a piston in the cylinder, connections between the piston and the gate formed to rock the gate upon travel of the piston, and oil supply tank, a pump having an intake line from said tank and a discharge line to said cylinder, a pressure operated electric switch subjected to the pressure in said discharge line, a motor adapted to operate said pump and controlled by said switch, a by-pass line about said pump between said discharge and intake lines, and an electrically operated valve in said by-pass line normally open, said valve being in electrical circuit with said source to be energized upon flow of current therefrom, and said switch and motor being in series connection with said source.

4. In a crossing gate having a standard on which the gate is rockably carried to swing normally toward an upright position, a cylinder, a piston in the cylinder, means interconnecting the piston with the gate, a tank adapted to hold a supply of oil, a pump having an intake line from the tank, a motor for driving the pump, a discharge line from the pump to said cylinder, check means in the discharge line between said pump and said cylinder, a source of current, an electric circuit including said source of current and said motor therein, a pressure operated switch subjected to pressures exerted in said cylinder from said discharge line, said switch being in said circuit and adapted to close and open the circuit within a predetermned range of said pressures, a pump and check means by-pass line returning back to said tank from said cylinder, an electromagnetically operated valve in said by-pass line normally open, an electrical circuit including said source of current and the electro-magnet means of said valve, and means for closing and opening both of said circuits simultaneously, said discharge line entering said cylinder on that side of said piston, movement of which from said point of entrance will cause said gate to be rocked and swing downwardly from its normal upright position.

HOWARD M. MEYER.
RALPH R. SCHEIDLER.